June 17, 1930.  F. V. DONALD  1,765,358
CULTIVATOR
Filed Nov. 26, 1926
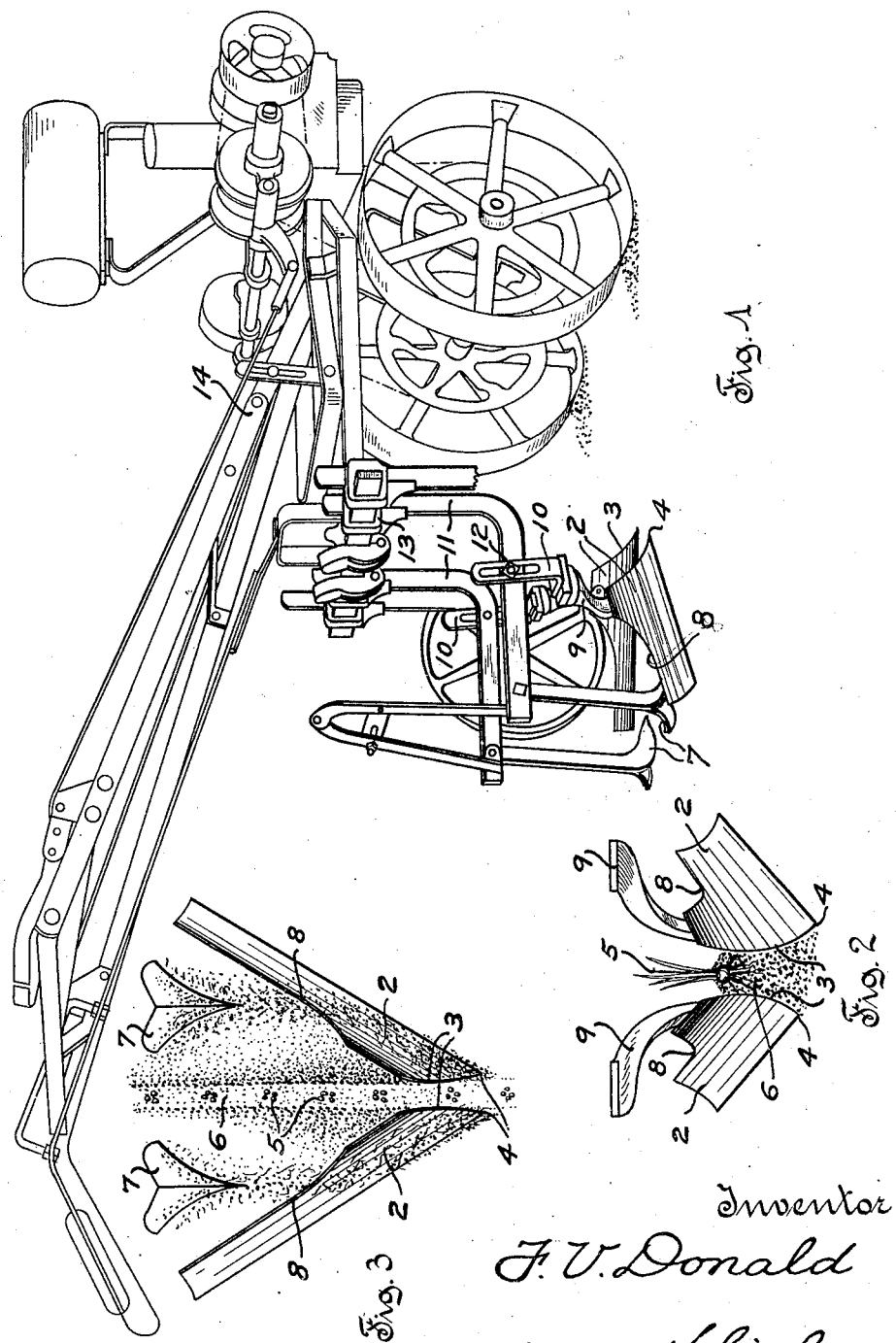
Inventor
F. V. Donald
by W. H. Lieber
Attorney Patented June 17, 1930

1,765,358

UNITED STATES PATENT OFFICE

FORREST V. DONALD, OF PORT WASHINGTON, WISCONSIN, ASSIGNOR TO GILSON MANUFACTURING COMPANY, OF PORT WASHINGTON, WISCONSIN, A CORPORATION OF WISCONSIN

CULTIVATOR

Application filed November 26, 1926. Serial No. 150,687.

This invention relates in general to improvements in the construction, operation and assemblage of cultivators, and relates especially to cultivating apparatus adapted for the treatment of rows of plants such as onions or the like.

An object of the invention is to provide a new and useful cultivator which will thoroughly cultivate plants arranged in rows, and which will effectively remove weeds, roots and other thrash from the sides of the rows and from the spaces between the successive plants constituting the rows. Another object of the invention is to provide an improved cultivating tool especially adapted for the treatment of plants such as onions or the like, arranged in narrow rows, whereby undesirable vegetation is prevented from growing or accumulating near the plants, and which will automatically remove the thrash from proximity with the plants and will also retain the surface soil in pulverized and properly spread condition. A further object of the invention is to provide improved soil treating shares of simple construction, adapted to be supported in pairs or groups for effective cultivation of plants arranged in parallel rows, with the aid of a tractor or similar propelling apparatus. These and other objects and advantages resulting from the use of the present improvement, will be apparent from the following description.

A clear conception of an embodiment of the invention and of the mode of operating cultivating apparatus constructed in accordance therewith, may be had by referring to the drawing accompanying and forming a part of this specification in which like reference characters designate the same or similar parts in the various views.

Fig. 1 is a somewhat diagrammatic perspective view of a tractor having one pair of the improved cultivating tools operatively supported thereby.

Fig. 2 is an enlarged front view of a pair of the improved cultivating tools, showing the same operatively associated with an intervening row of plants.

Fig. 3 is an enlarged top view of the shares of a pair of the improved cultivating tools, likewise showing the same operatively associated with an intervening row of plants.

Each of the improved cultivating implements or tools specifically illustrated in the drawing, comprises in general a curved blade or share 2 formed of sheet metal or the like, and a supporting arm 9 rigidly attached to and extending vertically above the share 2. Each share 2 has a sharp point or nose 4, and also has a forward cutting edge 3 extending upwardly and rearwardly away from its nose 4. The trailing end of each share 2 may furthermore be provided with a cut-away portion 8 as shown in the drawing.

The supporting arms 9 of the cultivator tools, are adapted to be vertically pivotally attached to brackets 10 which may be secured to suspension members 11 by means of adjusting mechanisms 12. The suspension members 11 may also be utilized as supports for the leveling and spreading devices 7, and are adjustably associated with a tractor 14 or similar propelling apparatus, by means of adjustable mechanisms or clamps 13. By virtue of the vertical pivotal connections between the arms 9 and the brackets 10, and also by virtue of the adjusting mechanisms 12, 13, the cultivator shares 2 may be disposed in any desired position relatively to the ground surface.

During normal operation of the improved cultivating implements, the curved shares 2 are preferably arranged in cooperating pairs as shown, with the cutting edge 3 of one share 2 slightly in advance of that of the cooperating share 2. The cooperating shares 2 extend laterally away from each other, and a leveling or spreading device 7 may be supported rearwardly of the cut-away portion 8 of each share 2 as shown in Fig. 3. With the elements thus assembled, the tractor 14 or other propelling device with which the shares are associated, may be advanced so as to cause the shares 2 to proceed along the opposite sides of a ridge 6 of earth in which the plants 5 are arranged in a row. During forward propulsion of the cultivator shares 2, the front noses 4 and the edges 3 of the moving tools, effectively cultivate the soil in the intervening ridge 6 and remove weeds and the roots of undesirable vegetation from the ridges 6 and from the spaces between the successive plants 5. The removal of vegetation from between the plants 5, is effected by virtue of engagement of the cutting edges 3 with the laterally projecting roots and leaves of such vegetation, and also because of the relative nearness of the cutting edges 3 of the cooperating shares 2, to each other at the crest of the ridge 6. The removed earth and weeds are delivered away from the row by the advancing outwardly directed curved side surfaces of the shares 2, and are eventually discharged over the cut-away portions 8 and into the paths of the advancing spreading devices 7. The devices 7 besides pulverizing the lumps, effectively spread the removed material, throwing the weeds and roots upon the top of the soil where they are dried and exterminated by exposure to the sun. In this manner the plants 5 are properly treated and the surrounding soil is effectively cultivated and freed from weeds and other undesirable vegetation.

It has been found practical when cultivating rows of onions or similar plants having relatively confined and compact roots, to position the cutting edges 3 of the cooperating shares 2, less than one inch apart, thereby insuring extremely effective cultivation and removal of weeds closely adjacent to the plant tubers. The curved supporting arms 9 prevent debris from accumulating on the cultivating tools, and also enable angular adjustment of the shares 2 to most effective working position. While a single set of cultivating tools has been shown and described as being associated with the tractor 14, it will be apparent that several sets may be applied to a single traction unit or other propelling device in order to enable treatment of several parallel rows of plants 5 at the same time. The adjusting clamps 13 constitute means for laterally adjusting the sets of cultivating implements, to accommodate rows spaced various distances apart, while the adjusting mechanisms 12 enable raising or lowering of the tools so as to properly cooperate with the ground. The cultivating tools are extremely simple and compact in construction, and the shares 2 may be manufactured of sheet metal with the aid of dies and permanently attached to the arms 9 by welding, riveting or otherwise. The improved implements have also proven extremely efficient in practical use, and may be manipulated by anyone reasonably skilled in the art of agriculture.

It should be understood that it is not desired to limit the present invention to the exact details of construction and to the precise mode of operation of the devices herein shown and described, for various modifications within the scope of the claims may occur to persons skilled in the art.

It is claimed and desired to secure by Letters Patent:—

1. In a cultivator, a pair of oppositely disposed but slightly staggered rearwardly diverging shares having backwardly and inwardly inclined front cutting edges and having trailing ends of considerably less height than the forward portions thereof adapted to advance entirely beneath the ground, the lower edges of said shares lying in approximately the same plane and being rectilineal throughout the length of the shares, means for supporting said shares in fixed position relative to each other, and a spreading device located in the path of travel of the trailing end of each of said shares for distributing material passing thereover across the path of said share.

2. In a cultivator, a pair of oppositely disposed but slightly staggered rearwardly diverging shares having backwardly and inwardly inclined front cutting edges and having trailing ends of considerable length and of materially less height than the forward portions thereof adapted to advance entirely beneath the ground, the lower edges of said shares lying in approximately the same plane and being rectilineal throughout the length of the shares, means for supporting said shares in fixed position relative to each other, and a spreading device located directly in back of the trailing end of each share and cooperating with said end to distribute material passing thereover laterally across the path of said share.

3. In a cultivator, a pair of oppositely inclined staggered rearwardly diverging shares having backwardly and inwardly inclined front cutting edges and having trailing ends of considerably less height than the forward portions thereof adapted to advance entirely beneath the ground, the lower edges of said shares lying in approximately the same plane, means for supporting said shares in fixed position relative to each other, and a spreading device located in the path of travel of the trailing end of each of said shares for laterally distributing material passing thereover.

In testimony whereof, the signature of the inventor is affixed hereto.

FORREST V. DONALD.